(12) United States Patent
Chiang et al.

(10) Patent No.: US 11,593,056 B2
(45) Date of Patent: Feb. 28, 2023

(54) INTERACTIVE EXERCISE APPARATUS

(71) Applicant: Johnson Health Tech. Co., Ltd., Taichung (TW)

(72) Inventors: Hsin-Huang Chiang, Taichung (TW); Yu-Chieh Lee, Taichung (TW); Ning Chuang, Taichung (TW); Wei-Ting Weng, Taichung (TW); Cheng-Ho Yeh, Taichung (TW)

(73) Assignee: Johnson Health Tech Co., Ltd., Taichung (TW)

( * ) Notice: Subject to any disclaimer, the term of this patent is extended or adjusted under 35 U.S.C. 154(b) by 8 days.

(21) Appl. No.: 17/401,285

(22) Filed: Aug. 12, 2021

(65) Prior Publication Data

US 2022/0050655 A1 Feb. 17, 2022

(51) Int. Cl.
*G06F 3/14* (2006.01)
*H04N 21/4223* (2011.01)
*A63B 71/06* (2006.01)
*H04N 21/4788* (2011.01)

(52) U.S. Cl.
CPC ........ *G06F 3/1454* (2013.01); *A63B 71/0622* (2013.01); *H04N 21/4223* (2013.01); *H04N 21/4788* (2013.01); *A63B 2220/807* (2013.01); *A63B 2225/20* (2013.01)

(58) Field of Classification Search
CPC ........... H04N 21/4122; H04N 21/4223; H04N 7/142; H04N 21/4788; G06F 3/1454; A63B 71/0622; A63B 2225/20; A63B 2220/807
See application file for complete search history.

(56) References Cited

U.S. PATENT DOCUMENTS

| | | | | |
|---|---|---|---|---|
| 10,449,435 B2* | 10/2019 | Kim | .................... | A63B 71/0622 |
| 10,758,780 B2* | 9/2020 | Putnam | .................... | A61B 5/024 |
| 10,828,551 B2* | 11/2020 | Putnam | ................ | A61B 5/0205 |
| 11,090,547 B2* | 8/2021 | Putnam | .............. | H04N 21/4415 |
| 11,110,336 B2* | 9/2021 | Putnam | .................... | G09F 13/12 |
| 11,130,041 B2* | 9/2021 | Kim | ........................ | G06F 3/0482 |
| 11,148,034 B2* | 10/2021 | Kim | .................... | A63B 24/0087 |
| 11,311,791 B2* | 4/2022 | Dion | ...................... | H04L 65/403 |
| 11,338,190 B2* | 5/2022 | Evancha | ............ | H04N 21/4415 |
| 11,344,786 B2* | 5/2022 | Intonato | ............. | A63B 71/0686 |
| 11,452,928 B2* | 9/2022 | Kim | ....................... | G06F 3/1454 |

(Continued)

FOREIGN PATENT DOCUMENTS

WO WO-2019231982 A1 * 12/2019 ............. A45D 42/00

*Primary Examiner* — Vinh T Lam

(57) ABSTRACT

An interactive exercise apparatus for allowing a user to invite a friend to join an exercise class includes a mirror display device, a communication module and a control unit. The mirror display device has a mirror configured to reflect an image of the user and a display device configured to display video content which includes an instructor image demonstrating an exercise in the exercise class. The communication module is configured to interconnect with another interactive exercise apparatus of the friend via a network. The control unit is configured to control display content and is operable to control the mirror display device to display the instructor image and a real-time image of the friend to the user. Specifically, the instructor image, the image of the friend and the image of the user reflected by the mirror are shown simultaneously on the mirror display device during the exercise class.

11 Claims, 18 Drawing Sheets

(56) References Cited

U.S. PATENT DOCUMENTS

| | | | | |
|---|---|---|---|---|
| 2012/0182431 | A1* | 7/2012 | Asanov | A63F 13/335 |
| | | | | 348/207.1 |
| 2020/0009444 | A1 | 1/2020 | Putnam | |
| 2020/0014967 | A1* | 1/2020 | Putnam | H04N 21/414 |
| 2021/0379447 | A1* | 12/2021 | Lee | A63B 24/0075 |
| 2022/0054925 | A1* | 2/2022 | Chiang | A63B 24/0006 |

* cited by examiner

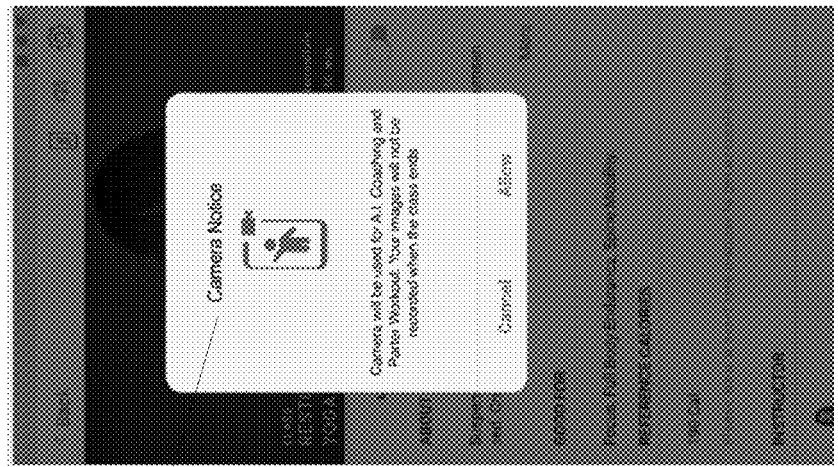
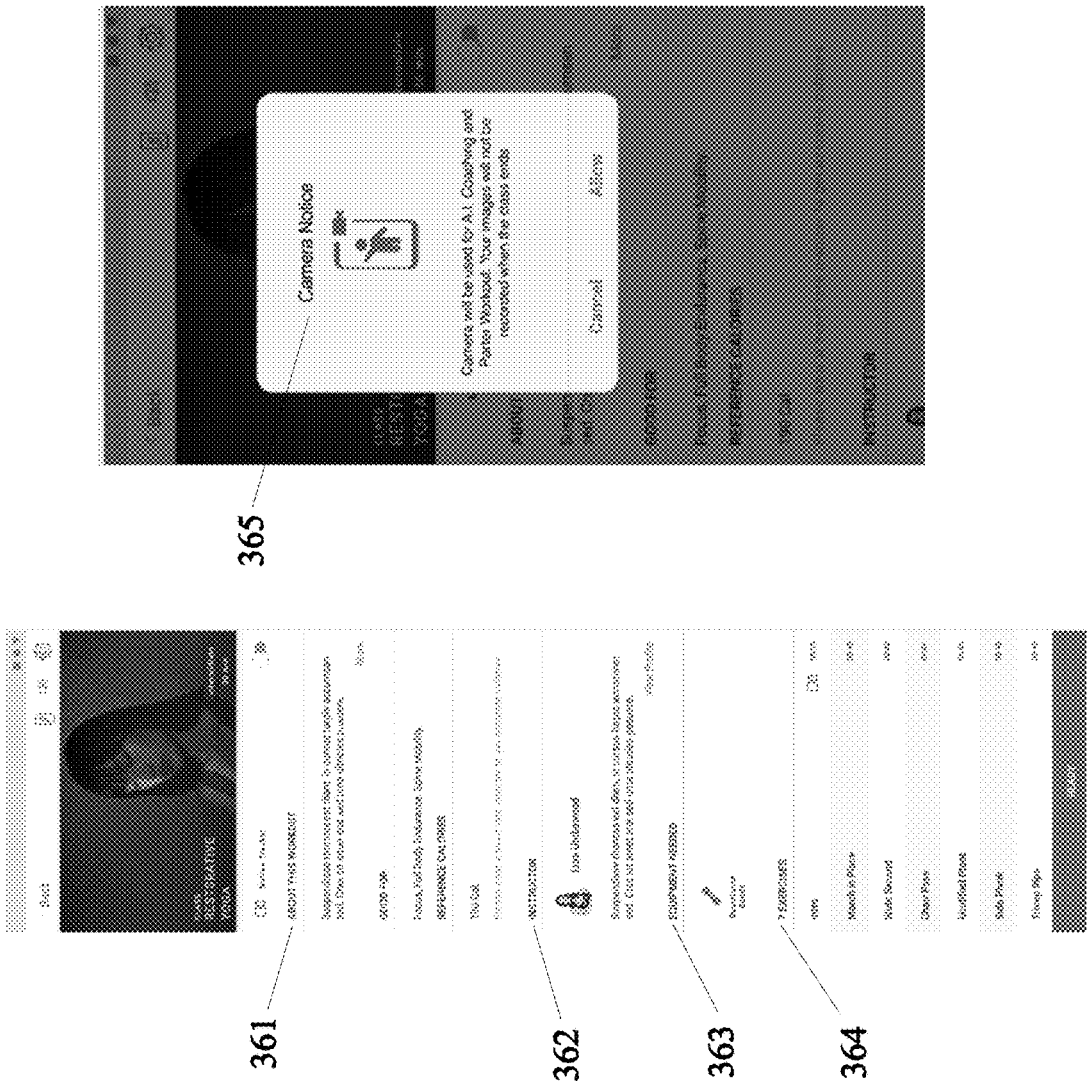
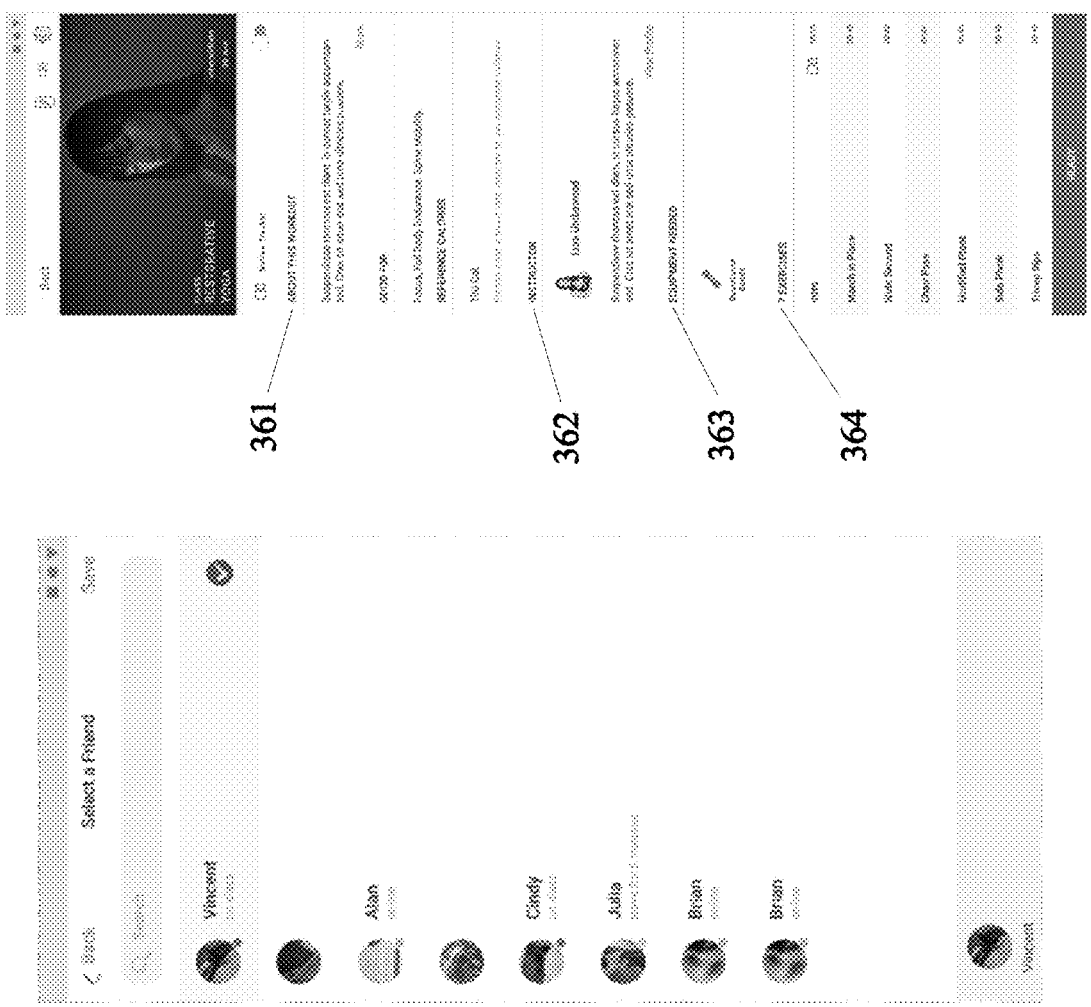
FIG. 14
FIG. 13
FIG. 12

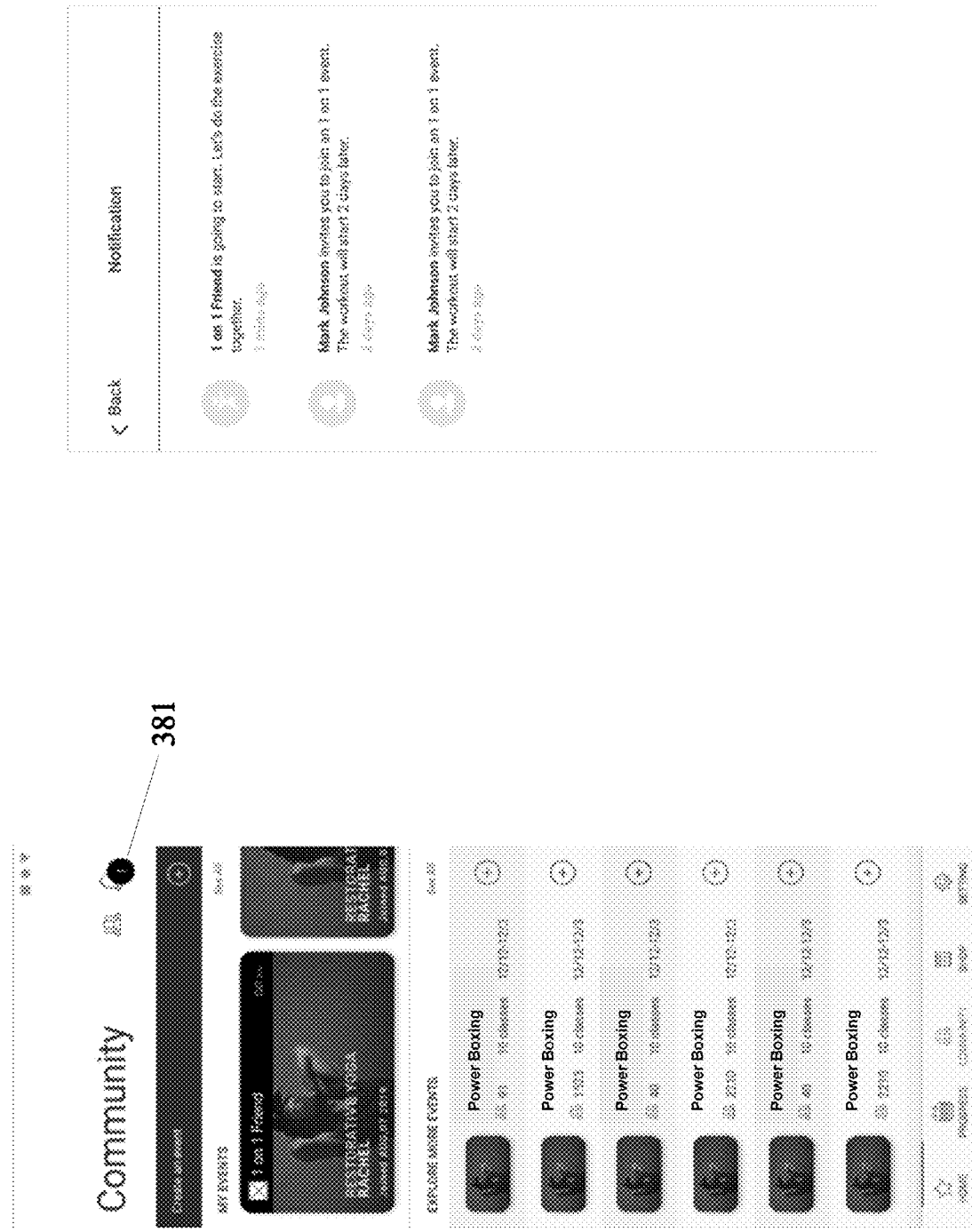

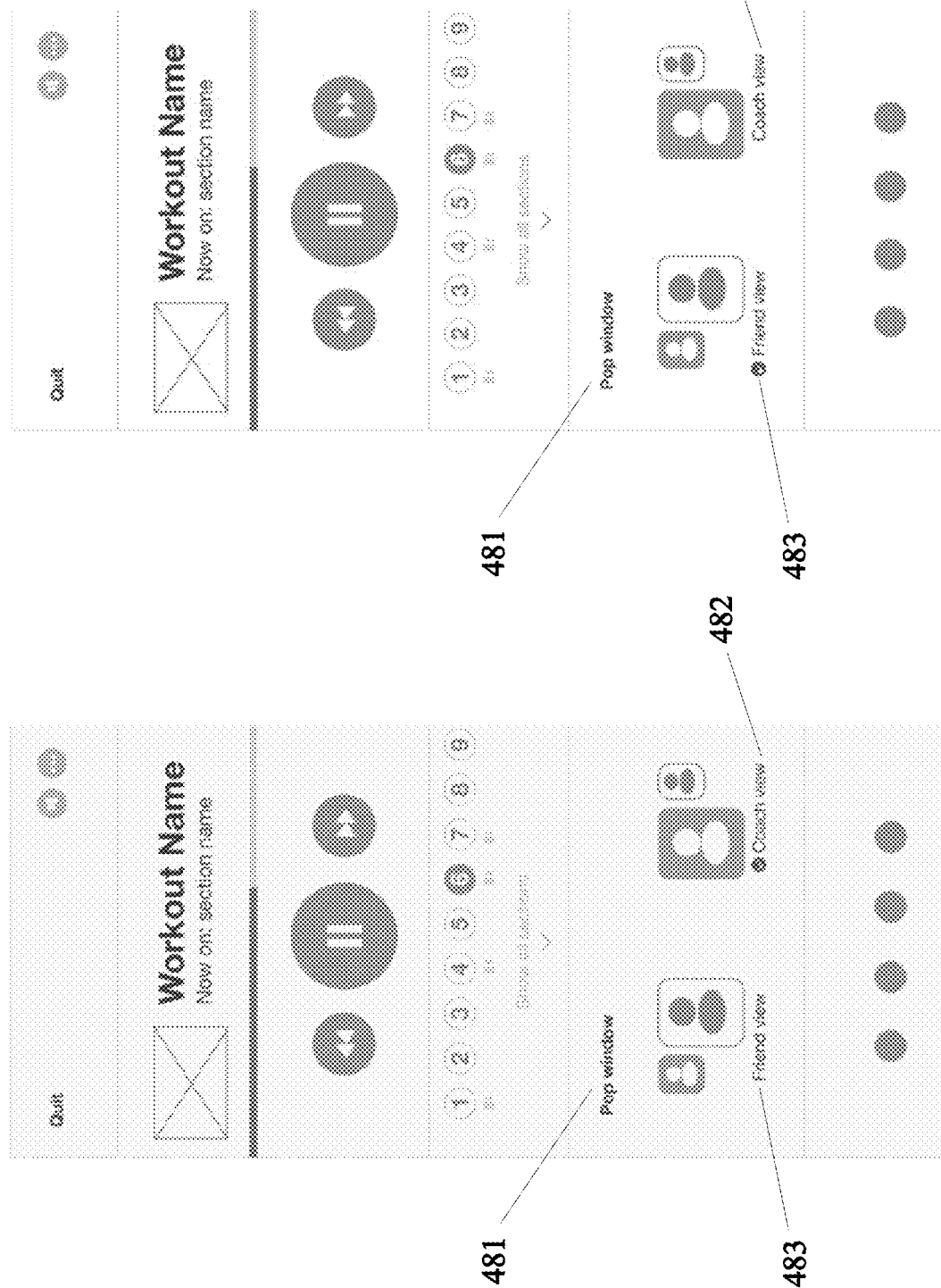

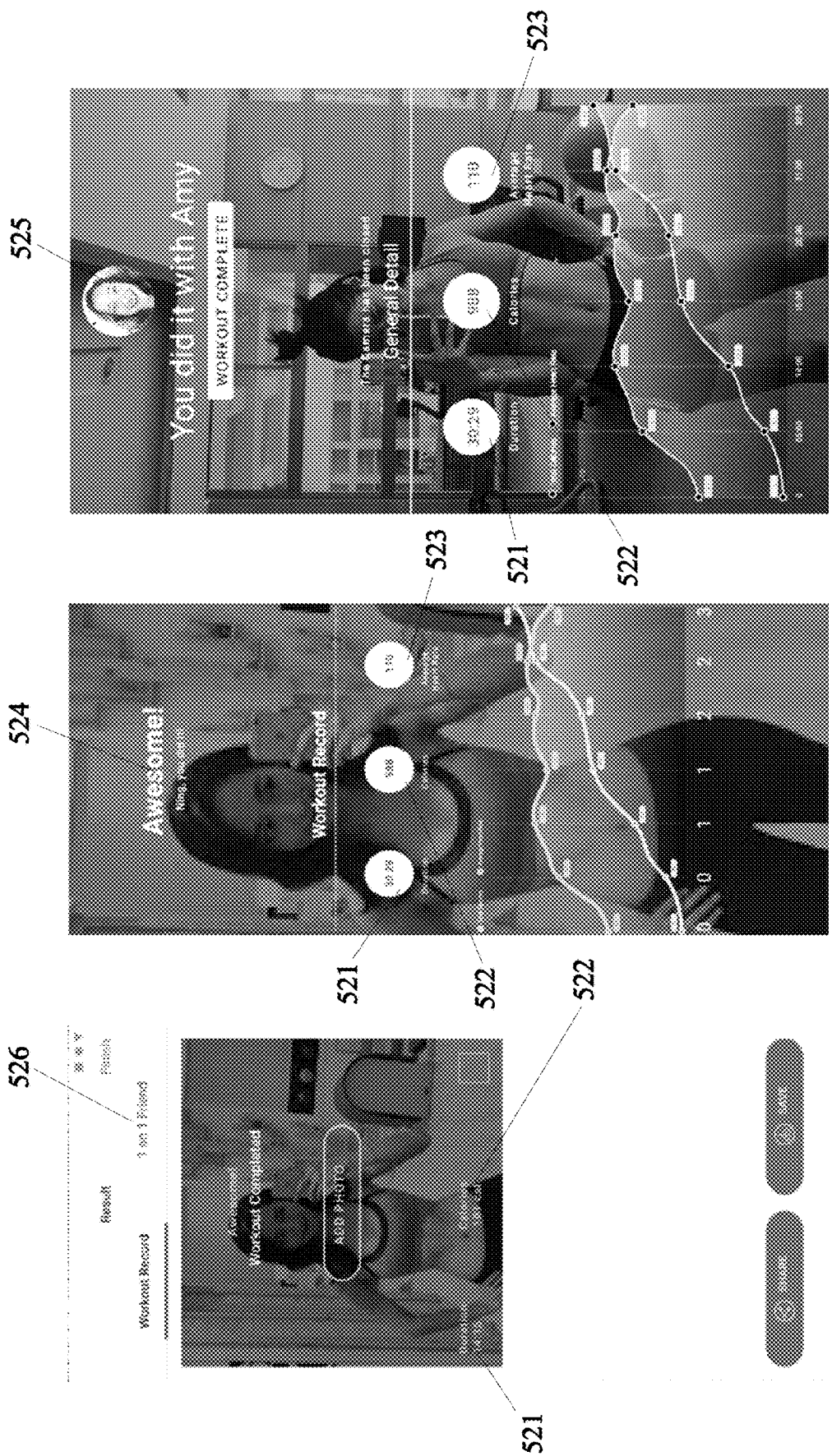

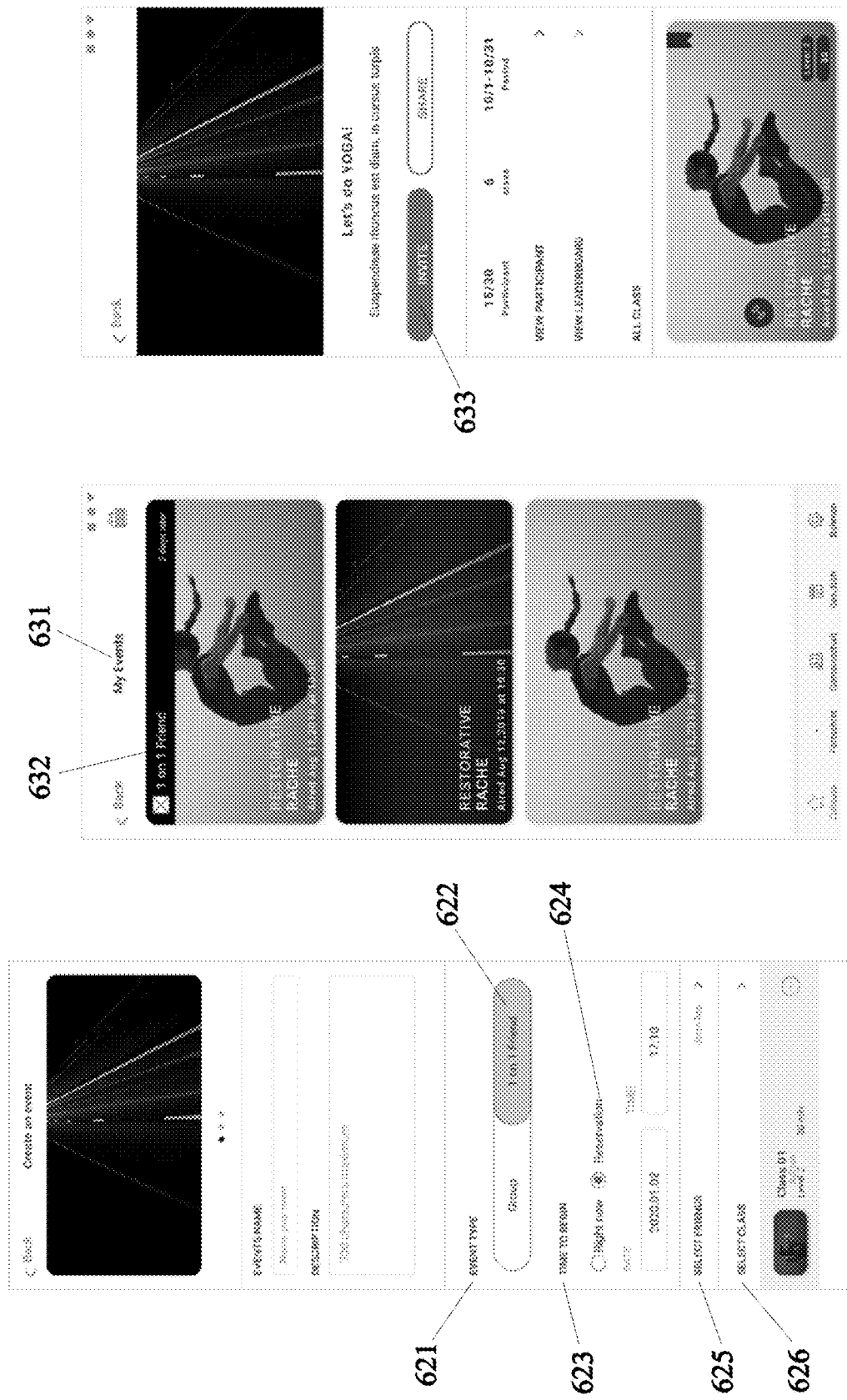

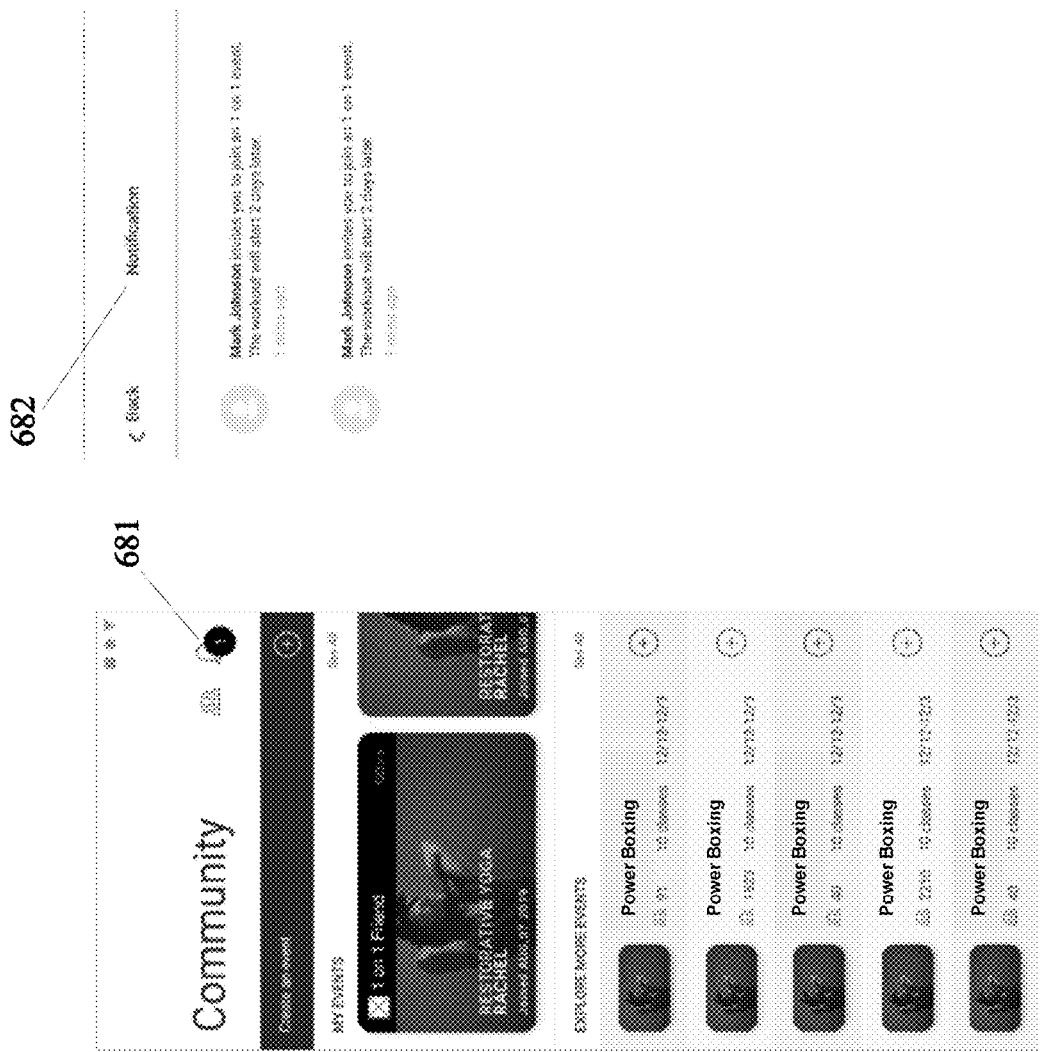
FIG. 37
FIG. 36
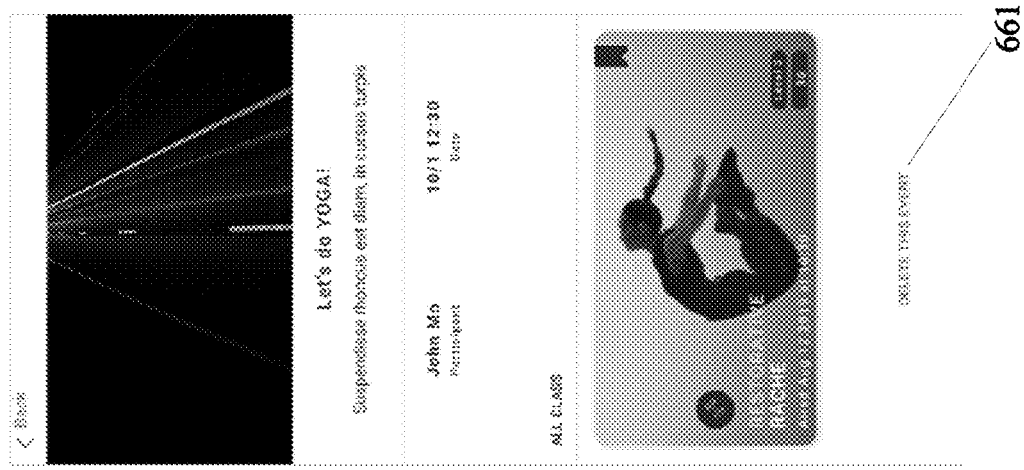
FIG. 35

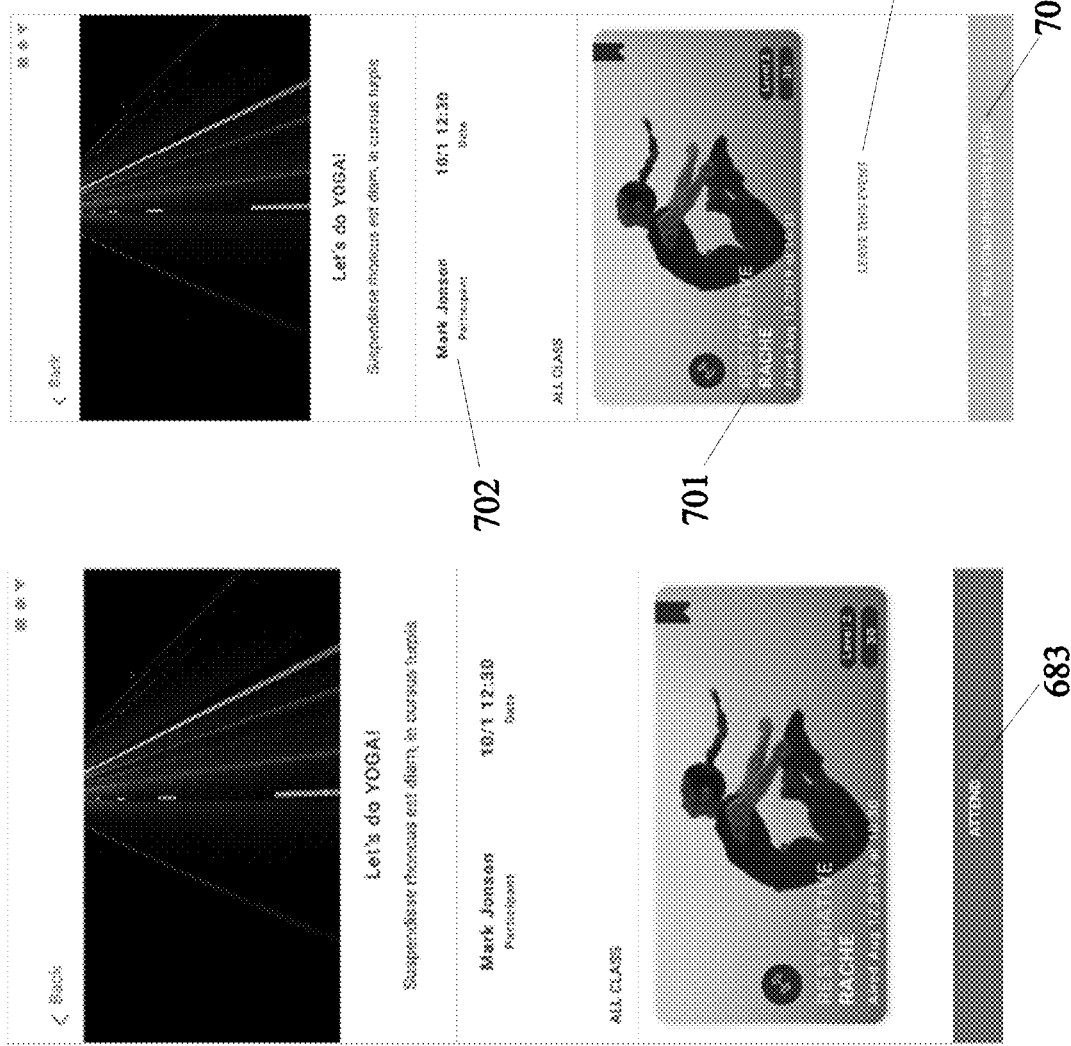

INTERACTIVE EXERCISE APPARATUS

BACKGROUND

1. Field of the Invention

The present invention relates to an interactive exercise apparatus. More particularly, the present invention relates to a mirror display device which is provided for a user to interact with friends while exercising.

2. Description of the Related Art

Indoor exercise is becoming more and more popular in these days. More people are becoming aware of the need to exercise in order to maintain or improve their health and fitness. Since a person's schedule, weather, or other factors may prohibit the person from exercising outdoors, it is more convenient for the person to exercise indoors.

There is a smart mirror product on the market, which can display demonstration images on the mirror, as a fitness instructor provides real-time instructions. When the user stands in front of the fitness mirror, the user can see their mirror image and follow the demonstration images to perform workout, such that the user can correct their motion or posture immediately. However, the conventional fitness mirror may not be provided for allowing the user to interact with other people such as their friends.

The present invention has arisen to mitigate and/or obviate the disadvantages of the conventional method. Further benefits and advantages of the present invention will become apparent after a careful reading of the detailed description with appropriate reference to the accompanying drawings.

SUMMARY

The present invention is directed to an interactive exercise apparatus for allowing a user to interact with their friend to participate in an exercise class.

According to one aspect of the present invention, an interactive exercise apparatus for allowing a user to invite a remote user to join an exercise class at a certain time includes a mirror display device, a communication module and a control unit. The mirror display device has a mirror and a display device disposed on a backside of the mirror, the mirror configured to reflect an image of the user opposite the mirror, the display device configured to display video content which is visible through the mirror, the video content including an instructor image performing an exercise in the exercise class. The communication module is configured to interconnect with another interactive exercise apparatus of the remote user via a network. The control unit is configured to control display content on the mirror display device, and is operable to control the mirror display device to display the instructor image and an image of the remote user to the user. Specifically, the instructor image of the exercise class, the image of the remote user and the image of the user reflected by the mirror are shown simultaneously on the mirror display device during the exercise class.

Preferably, the interactive exercise apparatus further has a portable device in communication with the communication module of the interactive exercise apparatus. The portable device has an application program for allowing the user to control operation of the mirror display device, and the user is able to invite the remote user to join the exercise class via the application program of the portable device.

Preferably, the application program has a friend list for allowing the user to choose and the remote user is one selected from the friend list.

Preferably, one of the instructor image and the image of the remote user is located at a center of the mirror and the other one is located at a position other than the center of the mirror. The mirror display device is switchable between a first display mode and a second display mode. When in the first display mode, the instructor image is located at the center of the mirror. When in the second display mode, the image of the remote user is located at the center of the mirror.

Preferably, the interactive exercise apparatus further has a camera device mounted on the mirror display device. The camera device is configured to capture the image of the user in front of the mirror display device, so that the user and the remote user are able to see each other on their own mirror display devices.

Preferably, during the exercise class, when one party of the user and the remote user is disconnected and reconnects to the exercise class, that party will return to current progress of the exercise class and synchronize the exercise class with the other party who is not disconnected.

Further benefits and advantages of the present invention will become apparent after a careful reading of the detailed description with appropriate reference to the accompanying drawings.

BRIEF DESCRIPTION OF THE DRAWINGS

FIGS. 4-16 show interfaces for operation of a fitness app on the user's portable device;

FIGS. 25-26 illustrate that the display mode of the mirror display device can be switchable;

FIGS. 27-30 show workout result of the user;

FIGS. 31-39 show interfaces for operation of quick reservation; and

FIG. 40 is a schematic diagram of dynamic synchronization of a streaming exercise class.

DETAIL DESCRIPTION

Figure 1:
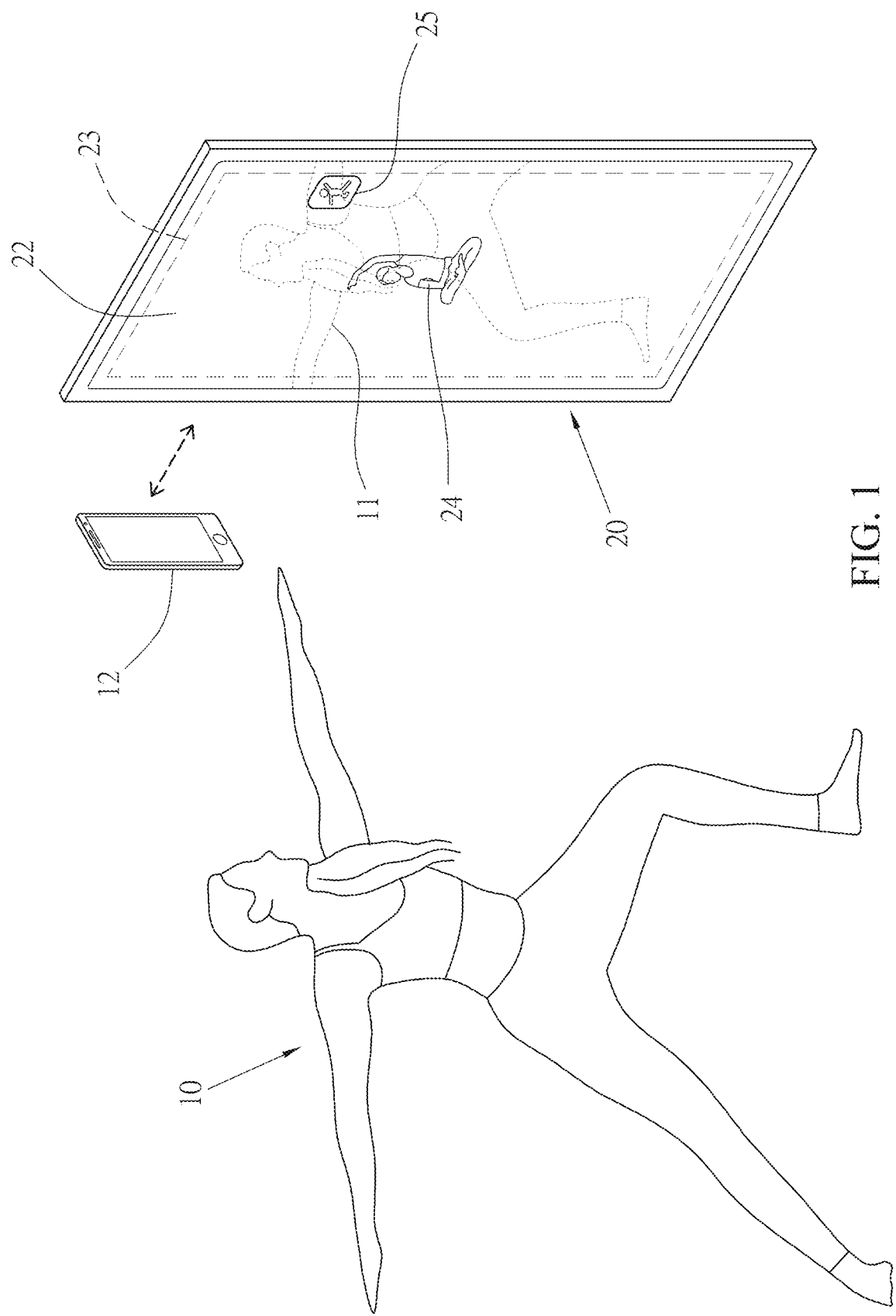
FIG. 1 illustrates an interactive exercise apparatus provided for guiding a user to perform a physical exercise with a friend in accordance with a preferred embodiment.

Referring to FIG. 1, an interactive exercise apparatus 20 (also referred to as a "smart mirror" hereinafter) is illustrated in accordance with a preferred embodiment of the present invention. The smart mirror 20 is a mirror display device provided for showing an instructor image 24 for guiding a user 10 to perform physical exercises or workout, such as stretching, aerobic, yoga, boxing, Pilates, or weight training. In general, the smart mirror 20 can be interconnected with a portable device 12 (e.g. a smart phone, a smart watch, a tablet, a computer) of the user 10 to form an interactive system. For example, the portable device 12 may be wirelessly connected to the smart mirror 20 via Wi-Fi, Bluetooth, radio frequency (RF), etc. The user 10 is able to invite one or more friends to join an online exercise class at a certain time, such that the user 10 can see the instructor image 24 of the exercise class and a real-time image of the friend (or any remote user) at the same time.

The smart mirror 20 has a frame, a mirror 22 mounted on the frame, and a displace device 23 disposed on the backside of the mirror 22. The frame is a rectangular frame for supporting the mirror 22 and the display device 23. The mirror 22 is configured to reflect an image of the user 10 opposite the mirror 22, so that the user 10 is able to see their mirror image 11 in the mirror 22. The display device 23 is configured to display video content including an instructor image 24 performing actions of an exercise class. The mirror 22 is a half mirror or a transparent mirror or a mirror having a partially reflecting section, such that the video content displayed on the display device 23 is visible through the mirror 22. The smart mirror 20 further has a control unit, a voice device, a communication module, and a camera device 201. The control unit regards as a computing and control core, which can be electrically connected to the display device 23, the voice device, the communication module and the camera device 201 and configured to control operation of the smart mirror 20.

The communication module is provided for allowing the smart mirror 20 to be connected to an external network, including local area network (LAN) and wide area network (WAN), to download data from a local or remote database, including exercise programs, and store in a storage device. Conversely, data can also be uploaded to the aforementioned database via the network, such as uploading fitness data of users. The smart mirror 20 can also be in communication with portable devices 12 (e.g. smart phones, smart watches, tablet computers, notebooks) via the communication module, forming a wired or wireless bidirectional communication connection, so as to transmit specific data to the portable device 12 or receive specific data from the portable device 12. The display device 23 is operable to display the instructor image 24 and the image of the friend (or friend image 25) on the smart mirror 20, as well as information related to the exercise classes.

The voice device may include a speaker to output video content and audio to the user, so that the smart mirror 20 can provide different sounds or voices according to the usage state, for example, the prompting sounds, video sounds, or inspired words. Besides, the voice device may also include a voice receiver to capture voices of the user, so that the user can input voice commands and/or voice inputs to the smart mirror 20.

Figure 2:
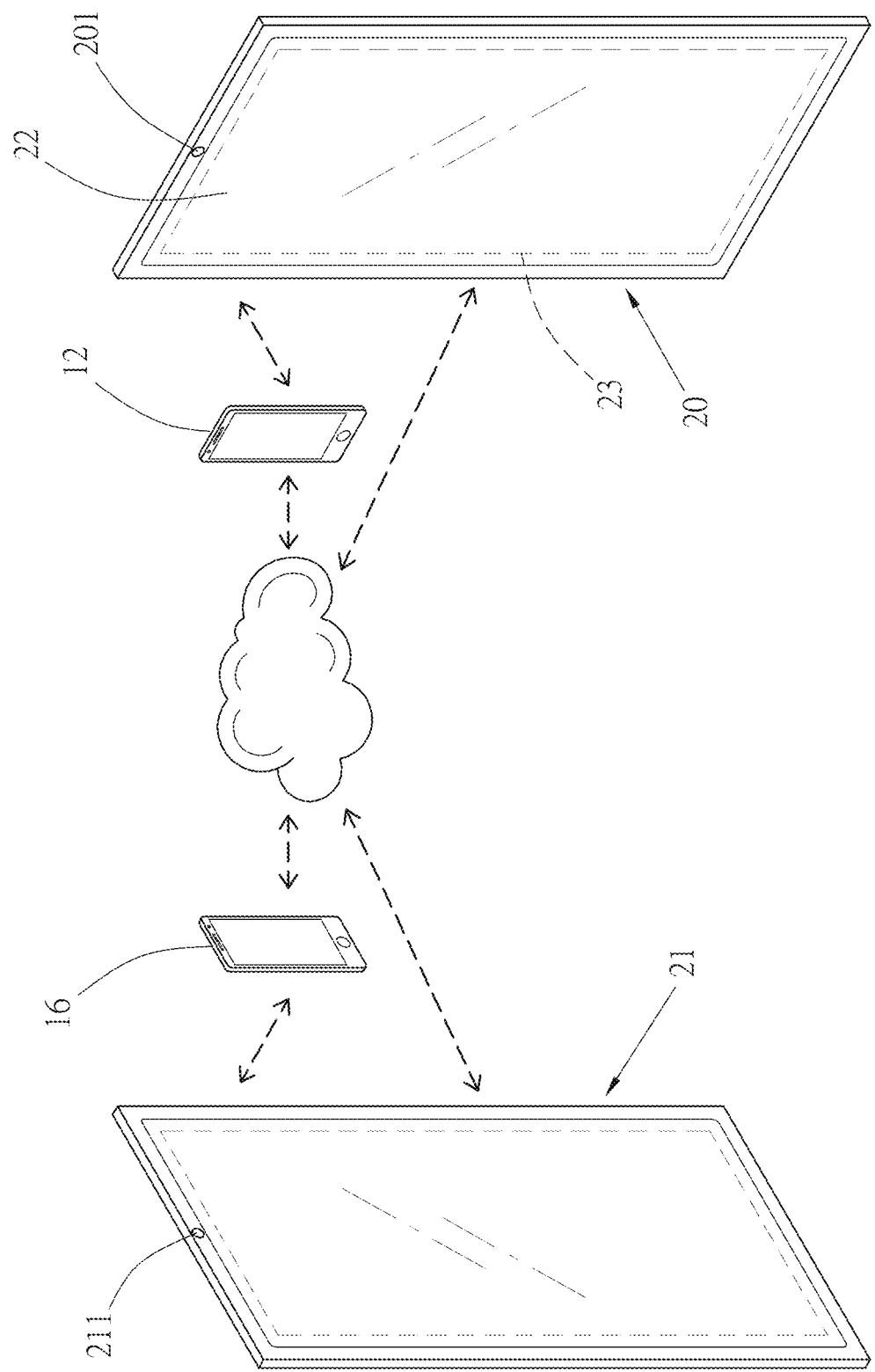
FIG. 2 illustrates two interactive exercise apparatuses can be interconnected with each other.

Referring to FIG. 2, two smart mirrors 20, 21 can be interconnected with each other. For example, the user's friend also has a smart mirror 21 which can be wirelessly connected with a portable device (or a smart phone) 12. The user 10 is able to connect with the smart mirror 21 of the friend through their smart mirror 20 to perform the exercise classes, or the user 10 can connect with the friend's portable device 16 or smart mirror 21 through their portable device 12. The portable devices 20, 21 each have an application program (namely a mobile application, also referred to as a mobile app or simply an app) for allowing the user to control operation of the respective smart mirror 20/21. The user 10 is able to invite their friends to join a specific exercise class via the application program of the portable device 20.

Figure 3A:
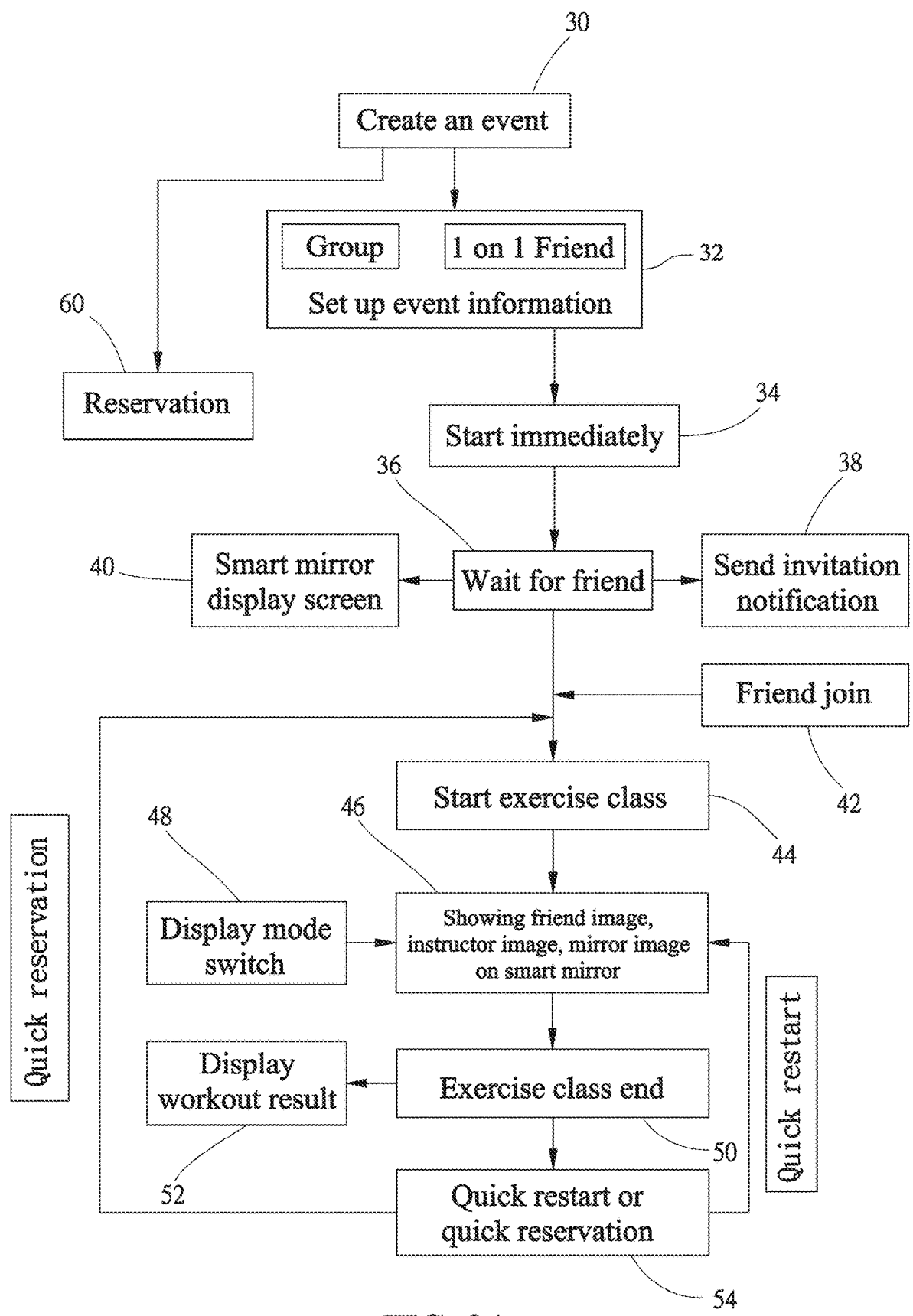
FIGS. 3A-3B show exemplary flow charts for operation of the interactive exercise apparatus.
Figure 3B:
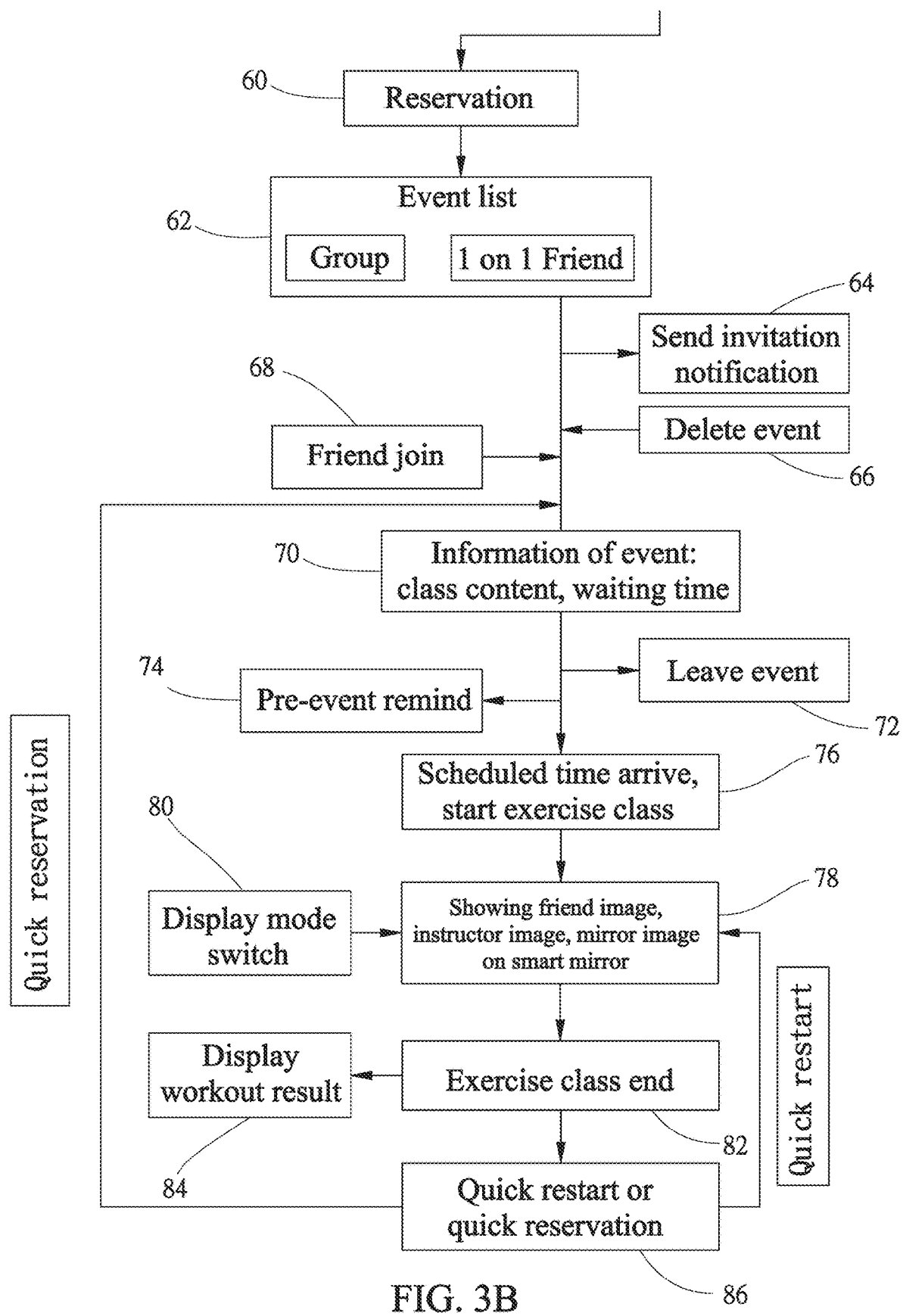
Figure 5:
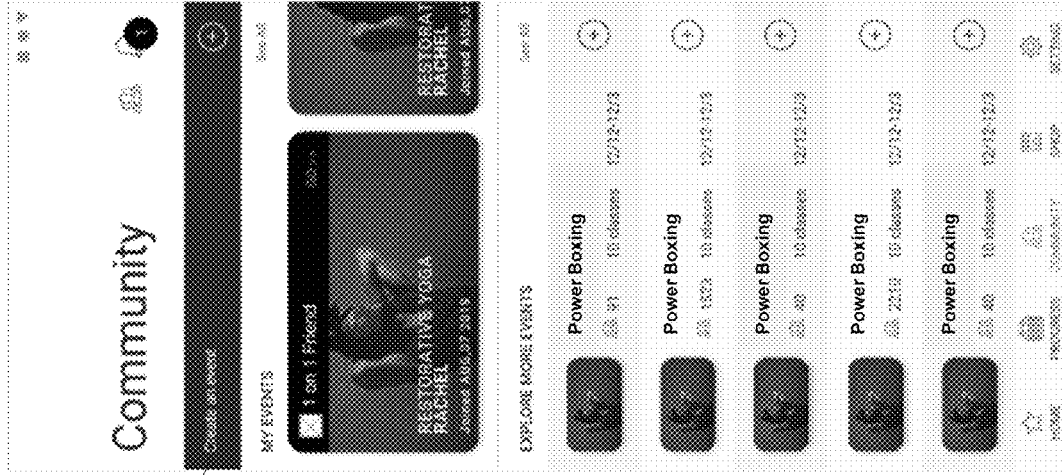
Figure 4:
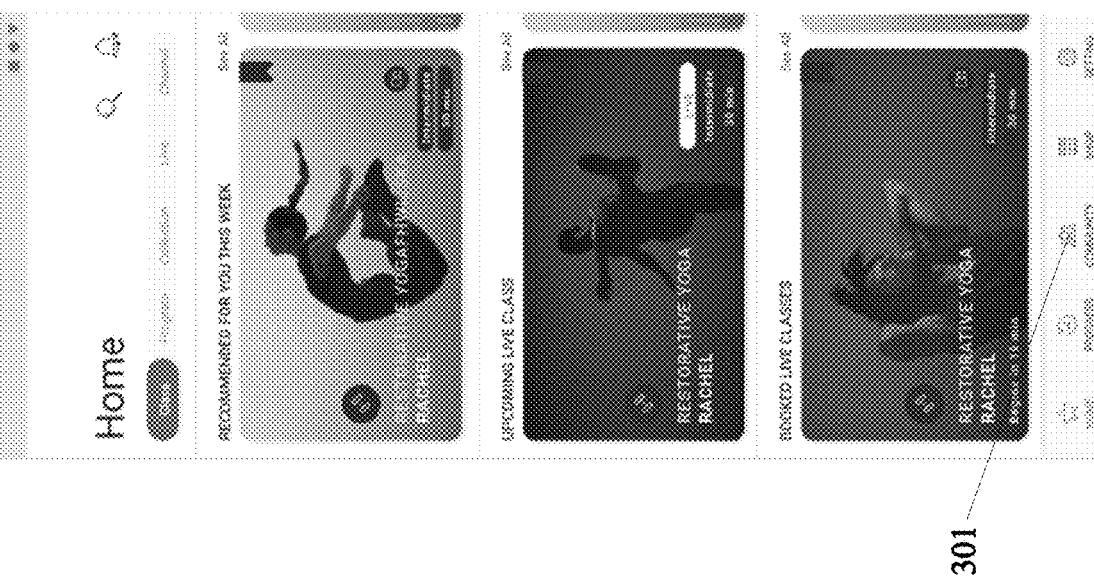
Figure 8:
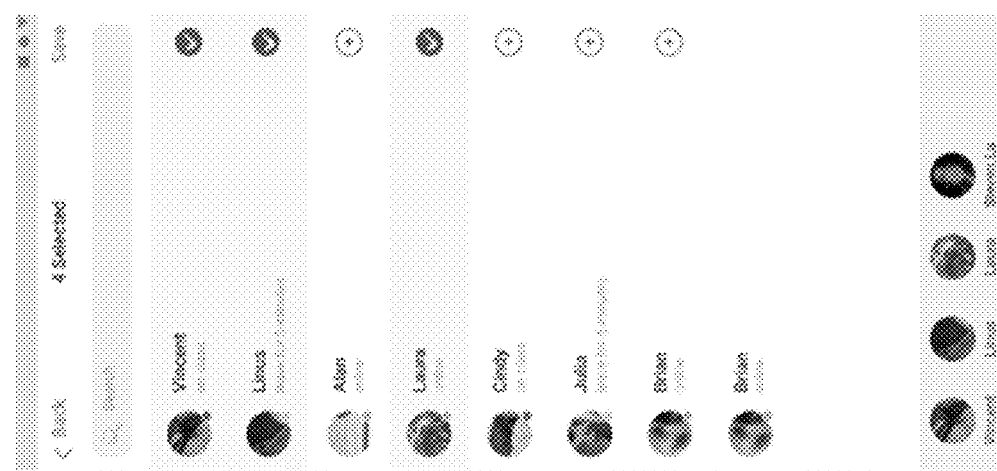
Figure 7:
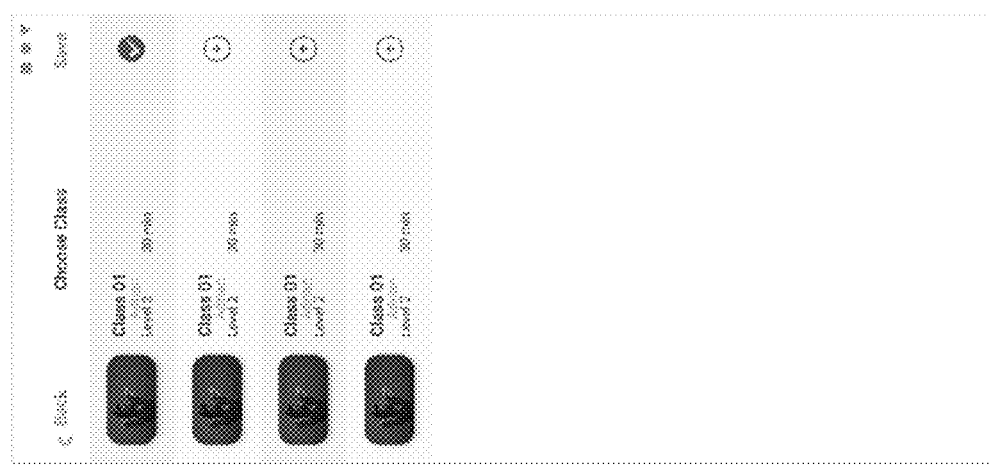
Figure 6:
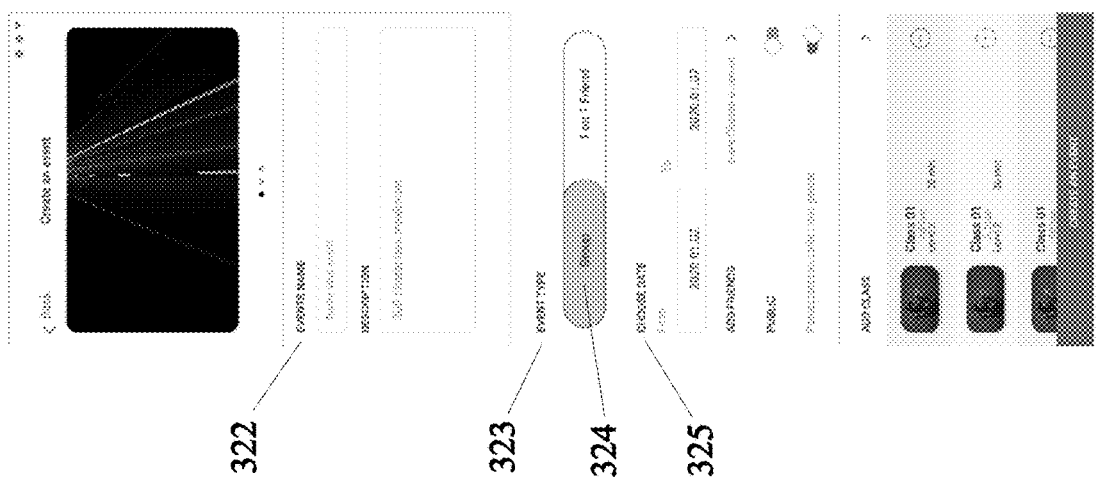

Before performing an activity, the portable device 12 has to connect with the smart mirror 20 for allowing the user 10 to control the smart mirror 20 via the portable device 12*t*. FIGS. 3A-3B show exemplary flow charts for operation of the interactive exercise apparatus 20. At first, it has to create an event at step 30 when the user 10 wants to perform an online synchronized fitness class with a friend (or a remote user). FIG. 4 shows an interface of a homepage of a fitness app on the screen of the user's portable device 12, presenting information of various fitness classes. The fitness app has a variety of fitness classes for the user to choose. When the user clicks the "Community" tab 301, the screen of the portable device 12 will switch to a "Community" interface, as shown in FIG. 5. The upper side of the "Community" interface has a touch area of "Create an event" 321 for setting up the event information, as step 32 in FIG. 3A. After the user touches the touch area of "Create an event" 321, the screen of the portable device 12 will display an interface as shown in FIG. 6, and the user can create content to complete the event in this interface, such as naming the event name 322, choosing the friends (plural or singular) to participate in the event together, and choosing a fitness class in the event. For example, as shown in FIG. 6, when the user chooses "Group" 324 at "Even type" 323, it can select fitness classes within a specific date interval such as fitness classes between 2020.01.02-2020.01.07. When touching the field at "Choose date" 325, it can change the date and adjust different time intervals. Then, choose one fitness class to be carried out, as shown in FIG. 7, and select friends to be invited to participate in the event from a list of friends, as shown in FIG. 8.

In the step 32, the user may choose only one friend to participate in an exercise event, such as the function of "1 on 1 Friend". Referring to FIG. 3A and FIG. 3B, step 34 to step 52 illustrate an operation flow for starting an exercise class, and step 60 to step 84 illustrate a reservation flow for reserving an exercise event. Step 54 and step 86 illustrate a function of quick restart or quick reservation after the exercise class is finished. The aforementioned operation flow can be applied to the "Group" exercise event as well.

Figure 11:
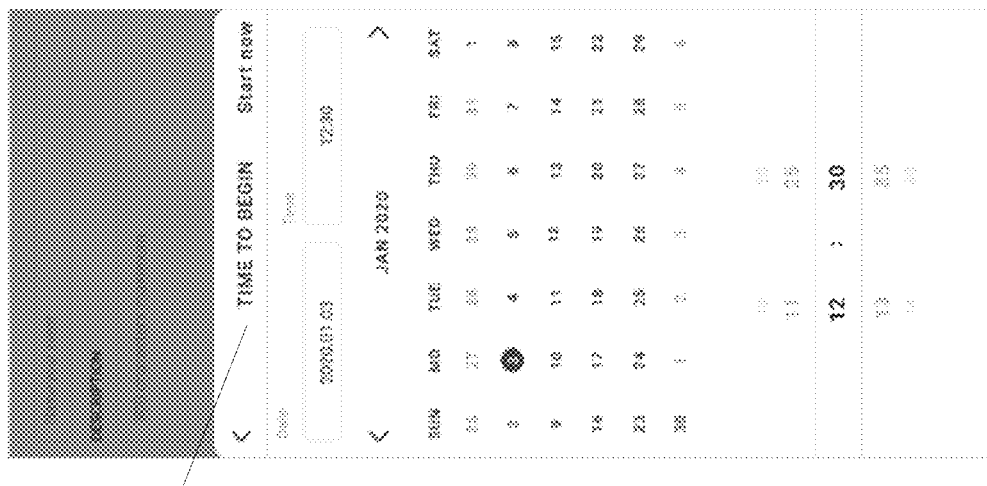
Figure 10:
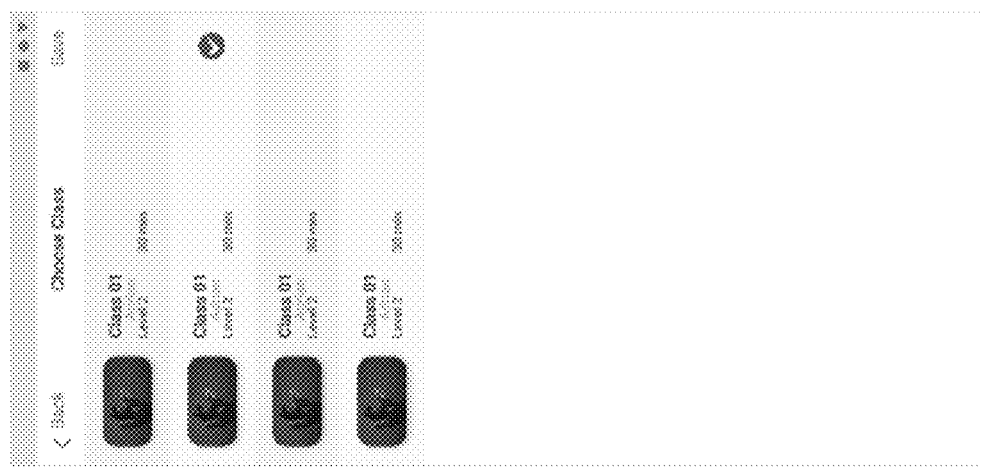
Figure 9:
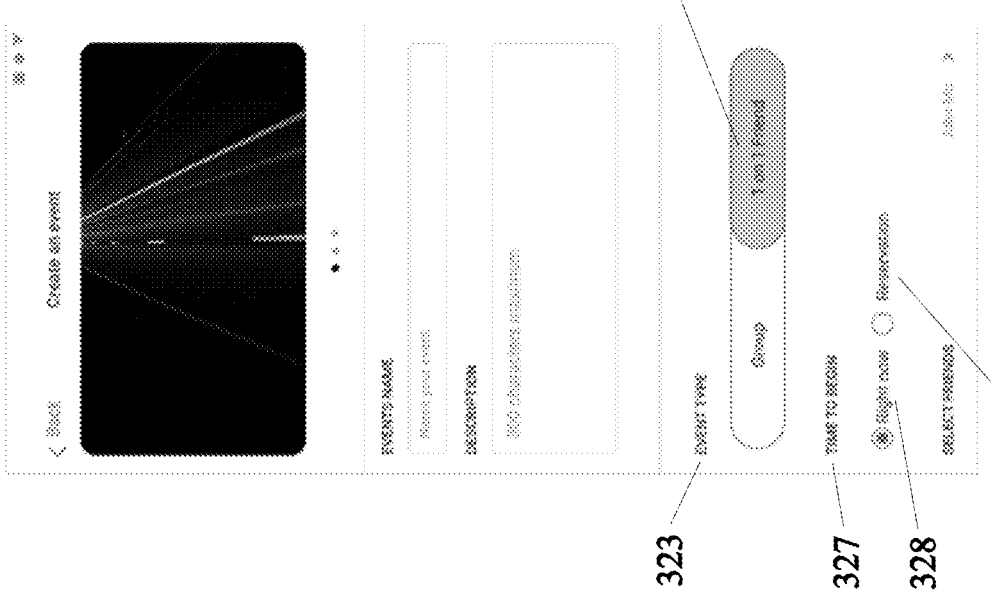

Referring to FIG. 9, when the user chooses the event type 323 of "1 on 1 Friend" 326 for exercise events or fitness activities, the item "Time to begin" 327 on the operation interface has two options of "Right now" 328 and "Reservation" 329 for the user to choose the time for the event or activity. FIG. 9 shows that the user selects the option "Right now" 328 for executing step of "Start immediately" 34 shown in FIG. 3A, and selects a fitness class in FIG. 10. Then, the user is able to select a certain time of the day (e.g. 2020.01.03) to start the fitness class at the "Time to begin" 341 on the interface as shown in FIG. 11, for example, select 12:30. Next, choose a friend (e.g. Vincent) in FIG. 12.

After completing the above settings, the system of the present invention will enter the step 36 of the operation flow shown in FIG. 3A, and the screen of the portable device 12 will show an interface as a waiting screen. This interface shows an introduction about this class (or workout) 361, an instructor 362, required equipment 363, and exercises 364. As shown in FIG. 14, the system will send a notice 365 for using camera to the user. When the user accepts, the camera device of the smart mirror 20 will record images of the user during the fitness class and stop when the fitness class ends.

After the event is created, the system will send an invitation notification to the invited friends, as step 38 in FIG. 3A, or send invitation notification to all participants of the event, including the user. As shown in FIG. 15, the invited friends will receive a notification 381 (as shown in the upper right corner of FIG. 15), and they can open the notification to watch the content of the notification, as shown in FIG. 16.

Figure 18:
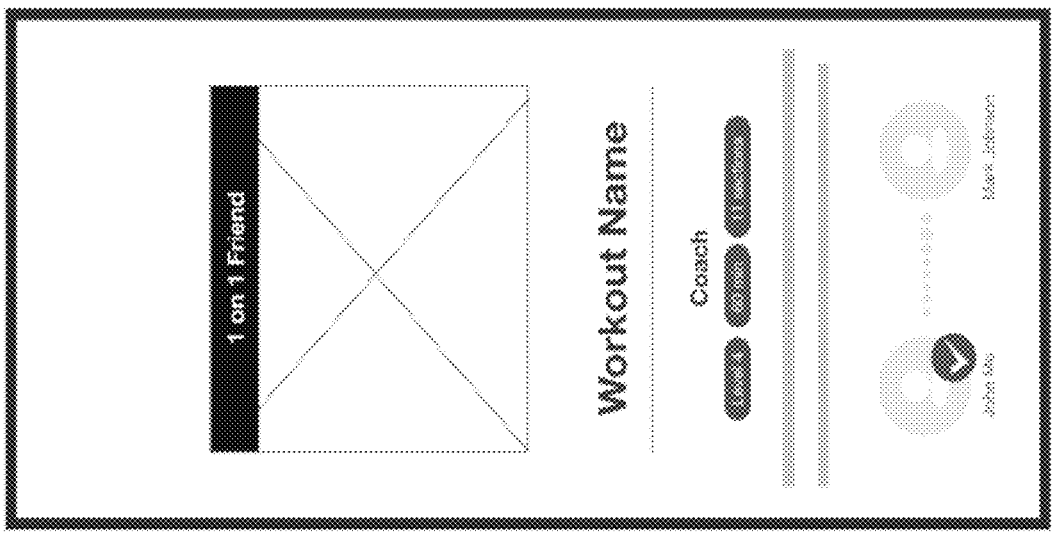
FIGS. 17-24 show display screens on an mirror display device and the user's portable device.
Figure 17:
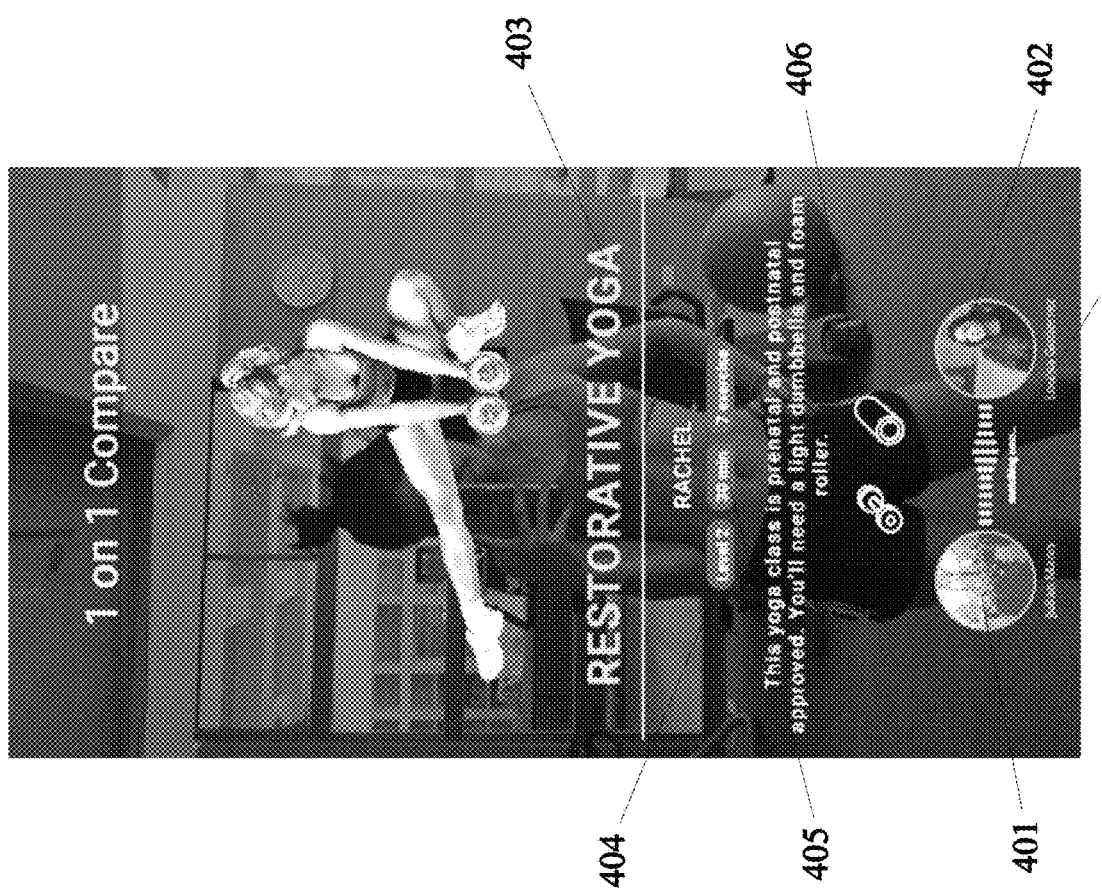
Figure 19:
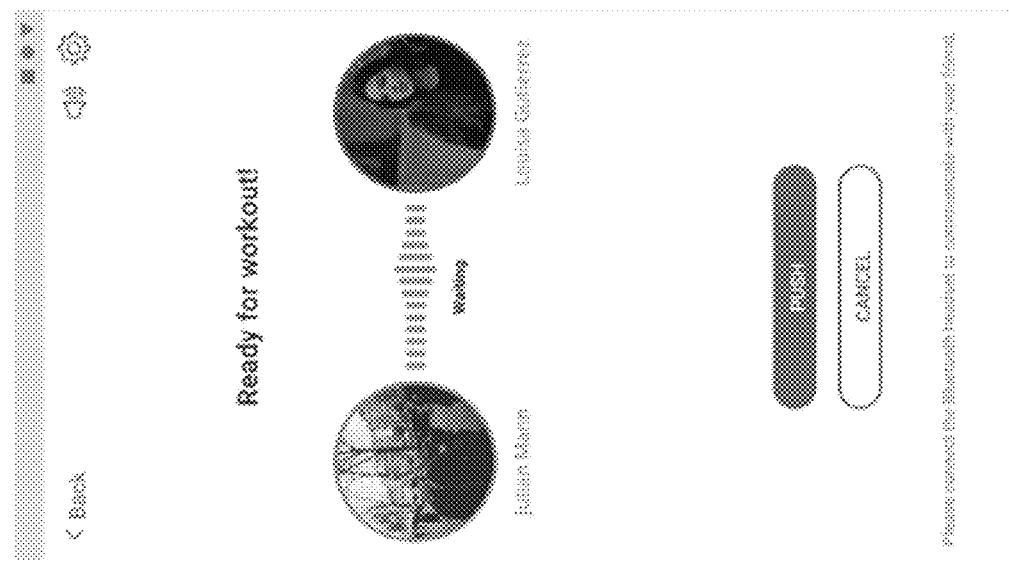

At this time, the system is waiting for the invited friends to join, and the smart mirror 20 shows a waiting screen as shown in FIG. 17, corresponding to step 40 of the operation flow shown in FIG. 3A. The waiting screen includes: profile pictures of the user and the invited friend 401, 402, workout name 403, workout level 404, workout time 405, equipment 406 and connection status 407 with the invited friend. FIG. 18 is a schematic diagram of the layout of the screen shown in FIG. 17. The portable device 12 will show the connection status between the user and the invited friend, as shown in FIG. 19. In the preferred embodiment, the user is able to communicate with the invited friend through a Bluetooth headset.

Figure 21:
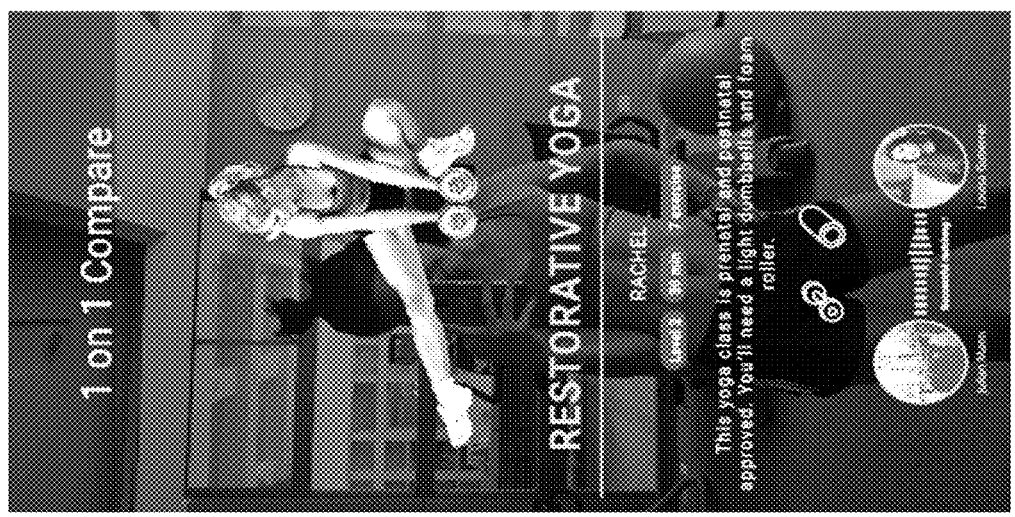
Figure 20:
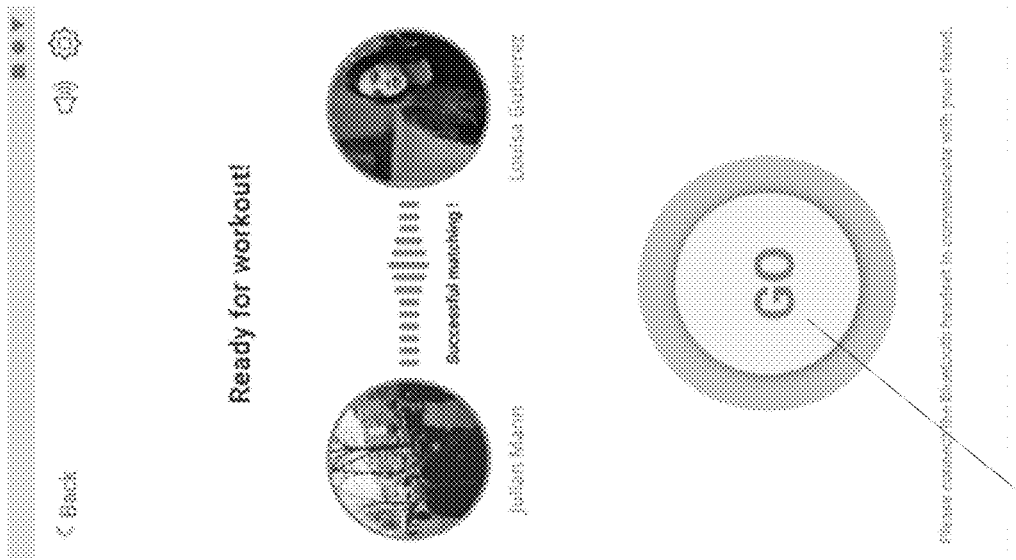

When the invited friend joins the event created by the user (step 42), and the user's interactive exercise apparatus is connected to the friend's interactive exercise apparatus (namely, the user's smart mirror 20 and the friend's smart mirror 21 are connected with each other; or the smart mirrors 20, 21 can be connected with each other through the respective portable devices 12, 16), the screen of the portable device 12 will show "Successful matching", as shown in FIG. 20, and the smart mirror 20 will also show "Successful matching" at the same time, as shown in FIG. 21. Therefore, the user can touch "Go" button in FIG. 20 to start the fitness class (step 44).

Figure 23:
Figure 22:
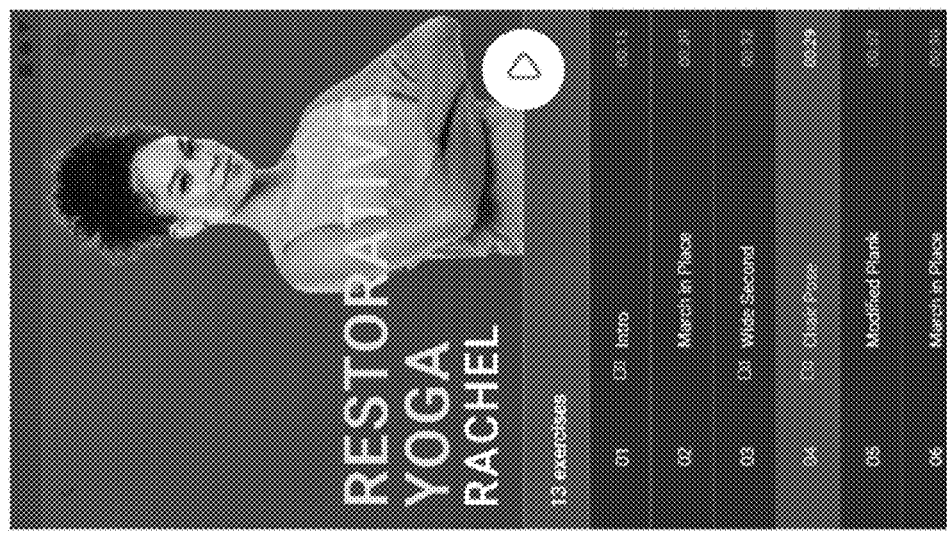

Referring to FIG. 23, when the fitness class starts (step 46), the instructor image 24, the friend image 25, and the mirror image 11 of the user will be shown on the mirror 22 of the smart mirror 20 simultaneously. Similarly, the mirror of the friend's smart mirror 21 also shows the instructor image, the real-time image of the user, and the mirror image of the friends. As shown in FIG. 2, the friend's smart mirror 21 has a camera device 211 configured to capture the friend's real-time image and transmit it to the user's smart mirror 20, so that the friend's real-time image (namely the friend image 25) can be displayed on the mirror 22 of the smart mirror 20. Similarly, the camera device 201 of the user's smart mirror 20 is operable to capture the user's real-time image and transmit it to the friend's smart mirror 21, so that the user's real-time image will be displayed on the mirror of the friend's smart mirror 21. The user can touch the "workout name" (e.g. a class for Restorative yoga) on the screen of the portable device 12 or on the mirror of the smart mirror 20 to understand the content of the class. At this time, as shown in FIG. 22, the workout items included in the fitness class will be shown on the portable device 12. The user is able to select a specific workout item for fitness exercise, or the system will perform all the workout items in sequence.

When performing fitness exercises, both the user and the friend can see the instructor image, their own mirror image and the other's image through the respective smart mirrors 20, 21. Therefore, the user and their friends can simultaneously perform fitness exercises remotely and interactively online.

Figure 24:
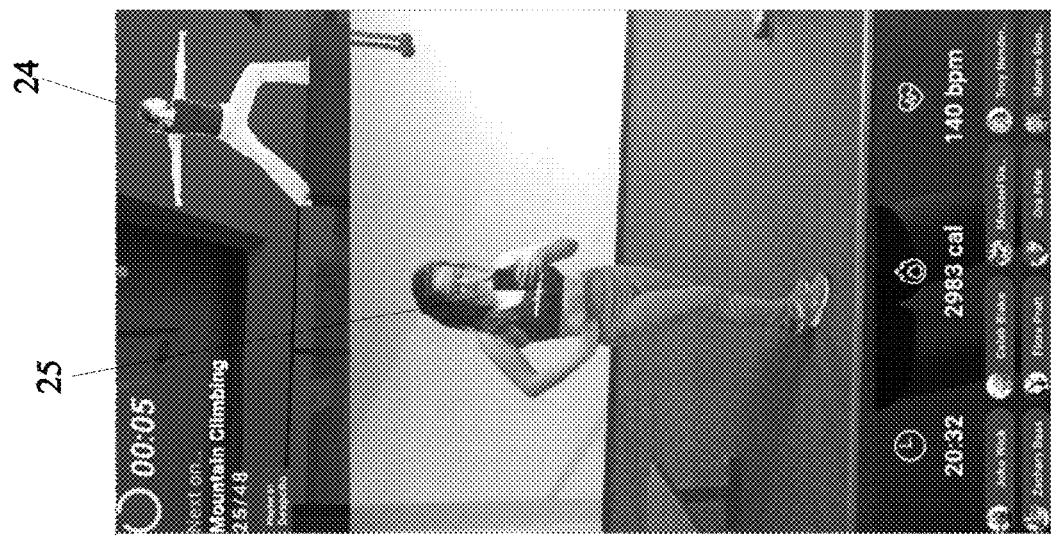

The fitness app is provided for allowing the user to switch display mode of the smart mirror 20 (as step 48). Referring to FIG. 25, when a coach view 482 (or coach mode) is selected in the pop window 481 on the interface of the portable device 12, the instructor image 24 will pop up in the center of the mirror 22, as shown in FIG. 0.23, and become the main window as the main visual area. It is convenient to watch and follow the movement demonstrated by the instructor image 24. In the coach mode, the friend image 25 will be displayed in a corner of the mirror 22, away from the center of the mirror 22. On the contrary, as shown in FIG. 26, when choosing a friend view (or friend mode), the friend image 25 will pop up in the center of the mirror 22, as shown in FIG. 24, and the instructor image 24 will be displayed in a corner of the mirror 22. The instructor image 24 and the friend image 25 are popup windows, which may be superimposed on the mirror image 11 of the user.

Figure 30:
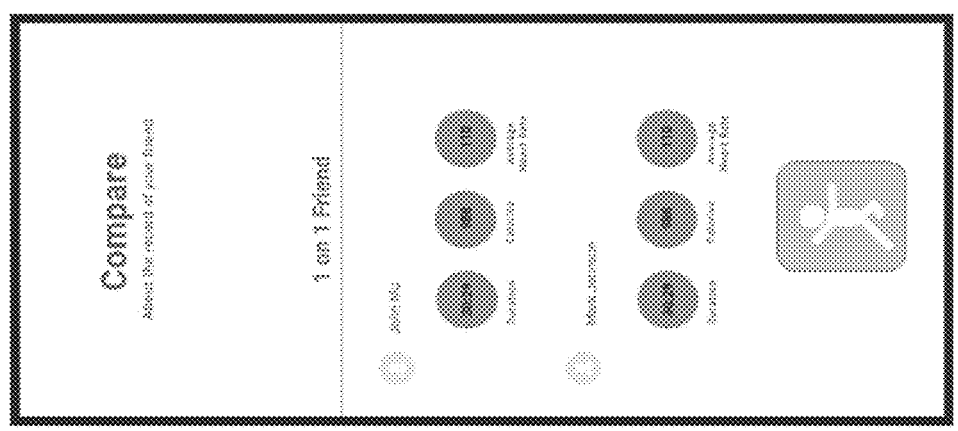

In steps 50 and 52, when the workout is completed (namely the fitness class is ended), the screen of the portable device 12 (as shown in FIG. 27) and the mirror 22 of the smart mirror 20 (as shown in FIG. 28) can display the data of the workout result, such as duration time 521, calorie consumption 522, average heat rate 523, and inspired words 524, and graphically show the burned calories and heart rate at different times. FIG. 29 shows another screen that the user has completed the workout with their friend and shows the friend's image 525. Referring to FIG. 30, the compared data about the record of the user and their friend can be displayed on the portable device 12 and/or the smart mirror 20. The portable device 16 and/or the smart mirror 21 of the invited friend will also display the same screens shown in FIGS. 23, 24, and 27-30, and the operations of FIGS. 22, 25, and 26 can also be performed.

The interactive system of the present invention is provided with operation of quick restart or quick reservation, as the step 54 of the operation flow shown in FIG. 3A. When the user chooses "1 on 1 Friend" 526 on the interface as shown in FIG. 27, the screen of the portable device 12 will enter the interface shown in FIG. 31 for the user to execute function of "quick restart" or "quick reservation".

Figure 31:
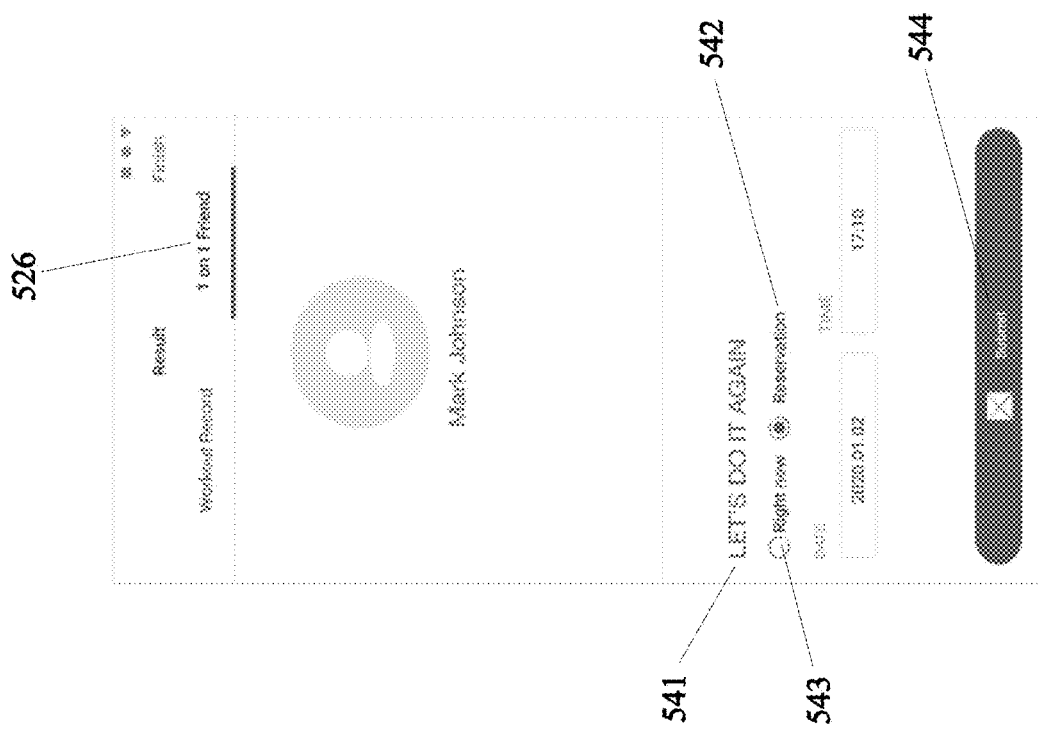

After the fitness class is finished, the user and their friend can execute function of "quick restart" or "quick reservation" to start the fitness class again if they intend to take the same fitness class again through a conversation or a massage. As shown in FIG. 31, if the user selects "Reservation" 542 in the option of "Let's do it again" 541. After setting the date and time, press the "Submit" button, and the system will book a fitness class with the same conditions as this fitness class (namely, the same class and the same participants as set in step 30 and 32). After completing the reservation, the system will send a notification to the user and their friend. The system will send a notification again before the scheduled time is about to arrive to remind the user and their friend that the scheduled time is coming, so that they can participate on time. When the scheduled time is reached, the participants of the fitness class can directly proceed to the step 44 or step 46 to start the fitness class.

If the user and their friend want to take the same fitness class again immediately, they can select "Right now" 543 in the option of "Let's do it again" 541 and press "Submit" button, such that the system will return to step 44 or step 46 and the participants will perform the same fitness class again. By the function of "quick restart" or "quick reservation" as step 54, users do not need to recreate an event from step 30 and make any selections and setting to achieve purposes of quickly performing fitness classes and quickly booking the same fitness class, so as to save setting time.

Furthermore, the interactive system of the present invention has a function of dynamic synchronization of a streaming exercise class. During the exercise class, when one party is disconnected, the screen of the disconnected party will be frozen or no image. For example, as shown in FIG. 40, if the friend is disconnected during the exercise class, the friend image 25 shown in FIG. 23 will be frozen, but the user will continue to exercise following the movement of the instructor image 24. When the friend reconnects, the user will rejoin the current exercise class, and the friend image 25 on the mirror 22 will be refreshed to redisplay the friend's real-time image. The friend will perform the exercise synchronously with the user according to the current progress of the exercise class, and finish the exercise class at the same time.

When the user wants to make a reservation for an exercise class (as step 60), the user can enter an interface of "create an event" through the fitness app, as shown in FIG. 32. The user can create a scheduled exercise class on this interface, including entering the event name, related description, etc. For example, in operation for creating an "1 on 1 Friend" event, the user can select "1 on 1 Friend" 622 at the "Event type" 621, and select "Reservation" 624 at the "Time to begin" 623 and select date and time, and then select friends 625 the user wants to invite (e.g. John Mo) and select class 626. After the selection is completed, the user can touch the "Create an event" button 627 at the bottom to complete the reservation.

Then entering step 62, the screen of the portable device 12 will show an interface of "My events" as shown in FIG. 33, which shows the user's scheduled or upcoming events. After selecting the scheduled "1 on 1 Friend" event 632, the screen of the portable device 12 will show an invited interface as shown in FIG. 34. When the user touches the "Invite" button 633, the system will send an invitation notification to the invited friend (as step 64). When the scheduled time is not arrived, the user can enter the interface of FIG. 35 and press the "Delete this event" button 661 to delete the reserved event (as step 66).

Referring to FIG. 36, after receiving the notification 681, the invitee (or the invited friend) can open the notification content 682, as shown in FIG. 37, which shows who invites him/her to participate in the "1 on 1 Friend" exercise class. The notification content 682 includes reminders that the exercise class is going to start and invitation records. The invitee is able to open the content of the invited scheduled event, as shown in FIG. 38. If the invitee is willing to participate, the invitee can touch the "Attend" button 683 (as step 68) to replay the inviter and the system will send a notification to inform the inviter (namely the user).

Referring to FIG. 39, the participants can open the scheduled exercise class on their portable devices (or smart phones), as step 70, and display the information of the exercise class, including: class content 701, class participants 702, waiting time 703, and so on. If a participant cannot attend this class afterward, they can touch the "Leave this event" button 704 on the interface of FIG. 39 (as step 72), and the system will send a notification to inform other relevant participants that one participant has left the event. Before the scheduled event stats (e.g. 6 hours before the event), the system will send a pre-event notification (as step 74) to remind participants to attend on time.

Referring to step 76, when the scheduled time arrives and the smart mirrors have been interconnected, the user is able to start the exercise event. As shown in FIG. 20, the user can touch "Go" button on the screen of the portable device to start the exercise class. In the reservation process, the portable device 12 has no need to be connected with the smart mirror 20, and the smart mirror 20 has no need to show any picture thereon until the exercise class is started.

Step 78 can refer to the aforementioned step 46 and FIG. 23. When the exercise class starts, the instructor image 24, the friend image 25, and the mirror image 11 of the user will be shown on the mirror 22 of the smart mirror 20 simultaneously. Similarly, the mirror of the smart mirror 21 of the invitee (or invited friend) also shows the instructor image, the real-time image of the user, and their mirror image. Therefore, the user and their friend are able to perform an online exercise class synchronously. The participant can execute the step 80 to switch the display mode of the mirror 22 to the coach mode or the friend mode, as shown in FIG. 23 and FIG. 24.

When the exercise class is finished (as step 82 and step 84), the screen of the portable device 12 (as shown in FIG. 27) and the mirror 22 of the smart mirror 20 (as shown in FIG. 28) can display the data of the workout result, such as duration time 521, calorie consumption 522, average heat rate 523, and inspired words 524, and graphically show the burned calories and heart rate at different times. As shown in FIG. 30, the compared data of the workout result of the user and their friend can be displayed on the portable device and/or the smart mirror.

Similarly, after the scheduled exercise class is finished, the participants can execute function of "quick restart" or "quick reservation" (as step 86) to start the same exercise class again for saving time, as shown in FIG. 31.

When selecting quick reservation, the system will be operated under the same condition, namely the same participants and exercise class. The user does not need to set or wait for the process from step 60 to step 68, so that the process can start from step 70, and the participants only need to wait for the scheduled time to arrive. The process of the quick reservation in the step 86 is the same as the process of the quick reservation in the step 54. If the participant executes "quick restart", the system will return to step 76 or step 78 and the participants will perform the same exercise class again. By the function of "quick restart" or "quick reservation" as step 86, users do not need to recreate an event from step 60 and make any selections and setting to achieve purposes of quickly performing exercise classes and quickly booking the same exercise class, so as to save setting time.

The system and method for online synchronization classes provided by the present invention allow users to invite their friends to take exercise classes online, and the friend's image can appear on the smart mirror to exercise simultaneously. During exercise, friends can participate in the exercise class together so as to make the exercise class more interactive and interesting, and make the fitness exercise more durable.

It is understandable that the operation interfaces of all operation procedures of FIG. 3A and FIG. 3B can be displayed on the touch screen of the smart mirror, so that the user can also perform the operations of the online exercise classes through the smart mirror.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An interactive exercise apparatus for allowing a user to invite a remote user to join an exercise class, comprising:
   a mirror display device having a mirror and a display device disposed on a backside of the mirror, the mirror configured to reflect an image of the user opposite the mirror, the display device configured to display video content which is visible through the mirror, the video content including an instructor image demonstrating an exercise in the exercise class;
   a communication module configured to interconnect with another interactive exercise apparatus of the remote user via a network; and
   a control unit configured to control display content on the mirror display device, and being operable to control the mirror display device to display the instructor image and an image of the remote user to the user;

wherein the instructor image of the exercise class, the image of the remote user and the image of the user reflected by the mirror are shown simultaneously on the mirror display device during the exercise class.

2. The interactive exercise apparatus as claimed in claim 1, further comprising a portable device in communication with the communication module of the interactive exercise apparatus, the portable device having an application program for allowing the user to control operation of the mirror display device, and the user is able to invite the remote user to join the exercise class via the application program of the portable device.

3. The interactive exercise apparatus as claimed in claim 2, wherein the application program has a friend list for allowing the user to choose and the remote user is one selected from the friend list.

4. The interactive exercise apparatus as claimed in claim 1, wherein one of the instructor image and the image of the remote user is located at a center of the mirror and the other one is located at a position other than the center of the mirror.

5. The interactive exercise apparatus as claimed in claim 4, wherein the mirror display device is switchable between a first display mode and a second display mode; when in the first display mode, the instructor image is located at the center of the mirror; when in the second display mode, the image of the remote user is located at the center of the mirror.

6. The interactive exercise apparatus as claimed in claim 1, further comprising a camera device mounted on the mirror display device, the camera device configured to capture the image of the user in front of the mirror display device, so that the user and the remote user are able to see each other on their own mirror display devices.

7. The interactive exercise apparatus as claimed in claim 1, wherein during the exercise class, when one party of the user and the remote user is disconnected and reconnects to the exercise class, that party will return to current progress of the exercise class and synchronize the exercise class with the other party who is not disconnected.

8. A method for allowing a user to interact with a remote user to participate in an exercise class, the method comprising:
providing an interactive exercise apparatus for the user to perform an exercise, the interactive exercise apparatus having a mirror configured to reflect an image of the user opposite the mirror and a display device configured to display video content including an instructor image demonstrating the exercise in the exercise class;
providing an notification to the remote user, the notification including that the remote user has invited to participate in the exercise class;
interconnecting the interactive exercise apparatus of the user to a remote interactive exercise apparatus of the remote user; and
displaying an image of the remote user on the interactive exercise apparatus of the user, such that the instructor image, the image of the remote user and the image of the user reflected by the mirror are shown simultaneously on the mirror of the interactive exercise apparatus during the exercise class.

9. The method as claimed in claim 8, wherein the image of the remote user is a real-time image of the remote user captured by a camera device mounted on the remote interactive exercise apparatus of the remote user.

10. The method as claimed in claim 8, further comprising: displaying one of the instructor image and the image of the remote user at a center of the mirror and the other one of the instructor image and the image of the remote user at a position other than the center of the mirror.

11. The method as claimed in claim 8, further comprising: displaying the instructor image at a center of the mirror of the interactive exercise apparatus when in a first display mode; displaying the image of the remote user at the center of the mirror of the interactive exercise apparatus when in a second display mode.

* * * * *